United States Patent [19]

Weyer

[11] 4,313,367
[45] Feb. 2, 1982

[54] ROTARY ACTUATOR

[76] Inventor: Paul P. Weyer, 48811 284th Southeast, Enumclaw, Wash. 98022

[21] Appl. No.: 147,861

[22] Filed: May 8, 1980

Related U.S. Application Data

[63] Continuation-in-part of Ser. No. 93,680, Nov. 13, 1979.

[51] Int. Cl.$^3$ .............................................. F01B 3/00
[52] U.S. Cl. ...................................... 92/33; 308/174
[58] Field of Search .......................... 92/31, 33, 32, 2; 308/174

[56] References Cited

U.S. PATENT DOCUMENTS

| | | | |
|---|---|---|---|
| 1,056,616 | 3/1913 | Wright | 92/33 |
| 2,948,263 | 8/1960 | Royer | 92/31 |
| 3,198,539 | 8/1965 | McMullen | 92/31 |
| 3,213,923 | 10/1965 | Richter | 92/33 |
| 3,255,806 | 6/1966 | Meyer | 92/33 |
| 3,388,603 | 6/1968 | Clark | 92/33 |
| 3,393,610 | 7/1968 | Aarvold | 92/33 |
| 3,613,169 | 10/1971 | Ziegler | 92/2 |
| 3,791,263 | 2/1974 | Walter | 308/174 |
| 3,834,283 | 9/1974 | Beichel | 92/33 |

Primary Examiner—Abraham Hershkovitz
Attorney, Agent, or Firm—Seed, Berry, Vernon & Baynham

[57] ABSTRACT

A helical rotary actuator is provided with end bearings which overlie or wrap around the cylinder wherein the piston of the rotary helical actuator is linearly reciprocated. The wrapping around of the bearing reduces the length of the actuator and also increases the circumferential bearing surface for carrying higher radial loads within the confined length of the actuator. In one embodiment, inner and outer radial bearings are provided with the outer bearing wrapping around and the inner bearing supporting the output shaft of the actuator through a large diameter collar for greatly increasing the radial load-carrying capacity of the actuator.

12 Claims, 5 Drawing Figures

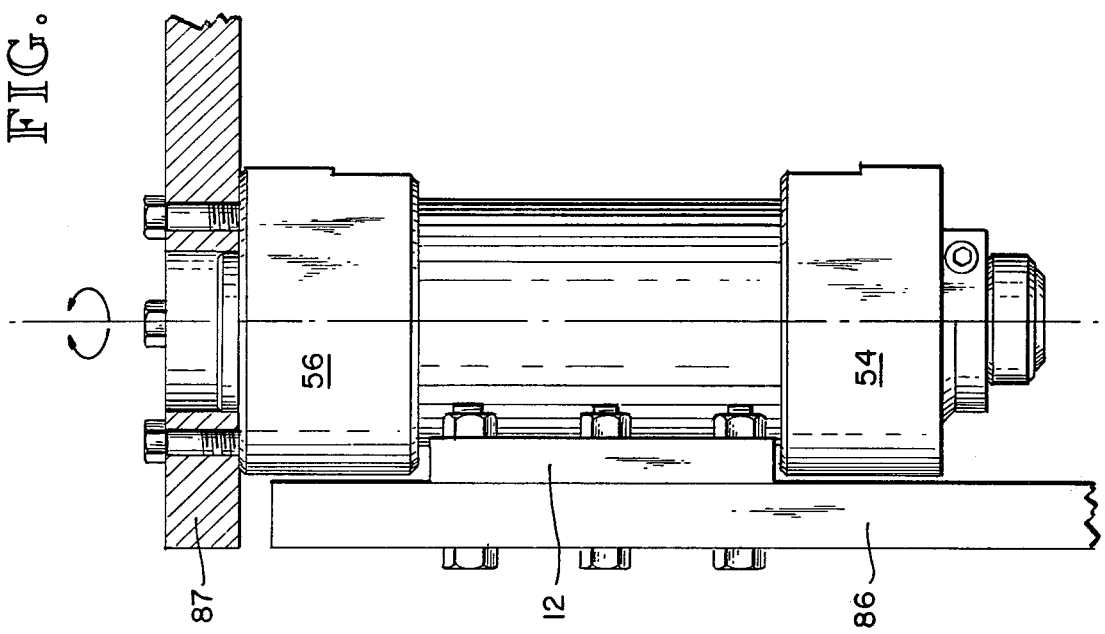
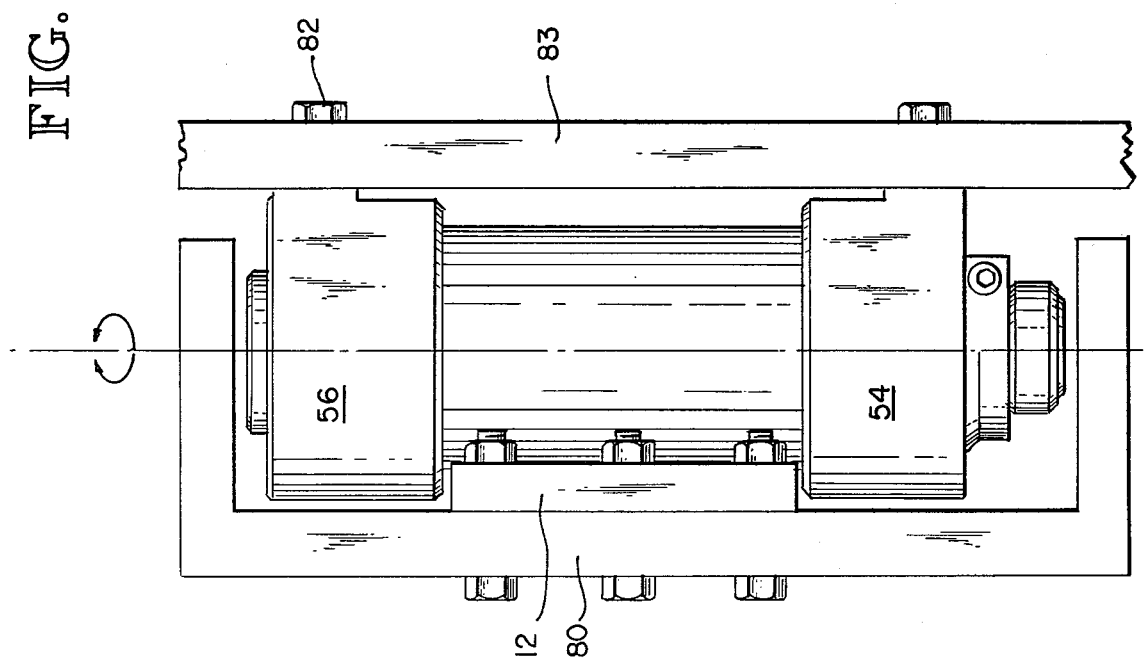

ROTARY ACTUATOR

CROSS-REFERENCE TO RELATED APPLICATION

This is a continuation-in-part of application Ser. No. 093,680, filed Nov. 13, 1979.

BACKGROUND OF THE INVENTION

1. Field of the Invention

This invention relates to rotary actuators of the type in which axial movement of a piston produces rotary motion of an output member.

2. Description of the Prior Art

Rotary helical actuators have been employed in the past and offer the advantages of high torque output capabilities from a simple linear piston and cylinder drive arrangement. One typical helical actuator is shown in U.S. Pat. No. 3,255,806. One of the shortcomings of these rotary helical acutators, however, is that the rotary output is determined to a large extent by the length of travel of the linearly moved internal piston. That is, the greater the length of movement of the piston, generally the greater the amount of rotational output for a given helical angle.

Rotary actuators are frequently applied to high torque load applications wherein the shaft of the actuator is held stationary and the cylinder or housing rotated or wherein the outer cylinder or housing is held stationary and the shaft is rotated.

Applications of helical actuators have been limited because the overall length of the actuator was too great for the space requirements and for the torque desired. A specific example is the hinge-pin for the articulated boom of a conventional backhoe or the like. This type of boom mounting has a short vertical pivot pin for allowing the boom to swing laterally. A linear hydraulic actuator is the coupled to the side of the boom for providing the lateral swinging. In some instances, this vertical pivot pin has been itself a rotary actuator and could be a helical rotary actuator. The length requirements, the large radial loads and the torque requirements for a pivot pin for such a boom have generally precluded, however, the use of a helical actuator in that location, since to provide the necessary bearings for swinging the boom when at full load, the actuator with its bearings between shaft and the cylinder have made the actuator too long for that application. Thus, it is this combined requirement of short length, large external radial or moment load capability and high torque capacity that has limited the useful applications for these rotary helical actuators.

SUMMARY OF THE INVENTION

It is an object of this invention to provide a helical actuator with high torque capabilities but having an overall short length.

It is another object of this invention to provide an improved rotary helical actuator with large diameter radial bearings sized to accept heavy external radial and moment loads.

It is another object of this invention to accept large external thrust loads.

It is a further object of this invention to provide a rotary actuator with large mounting surfaces and substantial internal bearings such that no auxiliary structures, like bearings, pins or brackets, are necessary to support heavy rotating loads.

Basically, these objects are obtained by wrapping around the thrust and radial bearings of the actuator over the cylinder which houses the internal helixes and linearly moved piston. In other words, rather than having the bearings axially aligned with the cylinder as in the prior art, U.S. Pat. No. 3,255,806, which adds to the overall length of the cylinder, the bearings in this invention are spaced over the cylinder and a bearing retainer provided around the cylinder to hold the bearings.

The advantages from this wrap-around bearing concept are that the overall length of the actuator is shortened over conventional axially spaced bearing techniques, and in addition, a synergistic effect is provided because the bearing now encompassing the cylinder rather than merely shaft is of substantially greater circumferential area and thus can handle higher external radial and moment loads. With such an actuator, it can easily be fitted within the length confines necessary for serving as a rotary pivot pin for boom articulation. Furthermore, since the wrap-around bearing provides an end surface opposing the cylinder, thrust bearings can be fitted easily within this space to avoid further length caused by thrust bearings along the shaft.

In the preferred embodiment, a second set of radial bearings are positioned internally of the cylinder but on a large diameter collar which thus provides additional bearing area without increasing the length of the actuator.

BRIEF DESCRIPTION OF THE FIGURES OF THE DRAWING

FIG. 3 is an elevation of one form of mounting arrangement of the invention.

FIG. 4 is an elevation of another mounting arrangement of the invention.

DESCRIPTION OF THE PREFERRED EMBODIMENT

Figure 1:
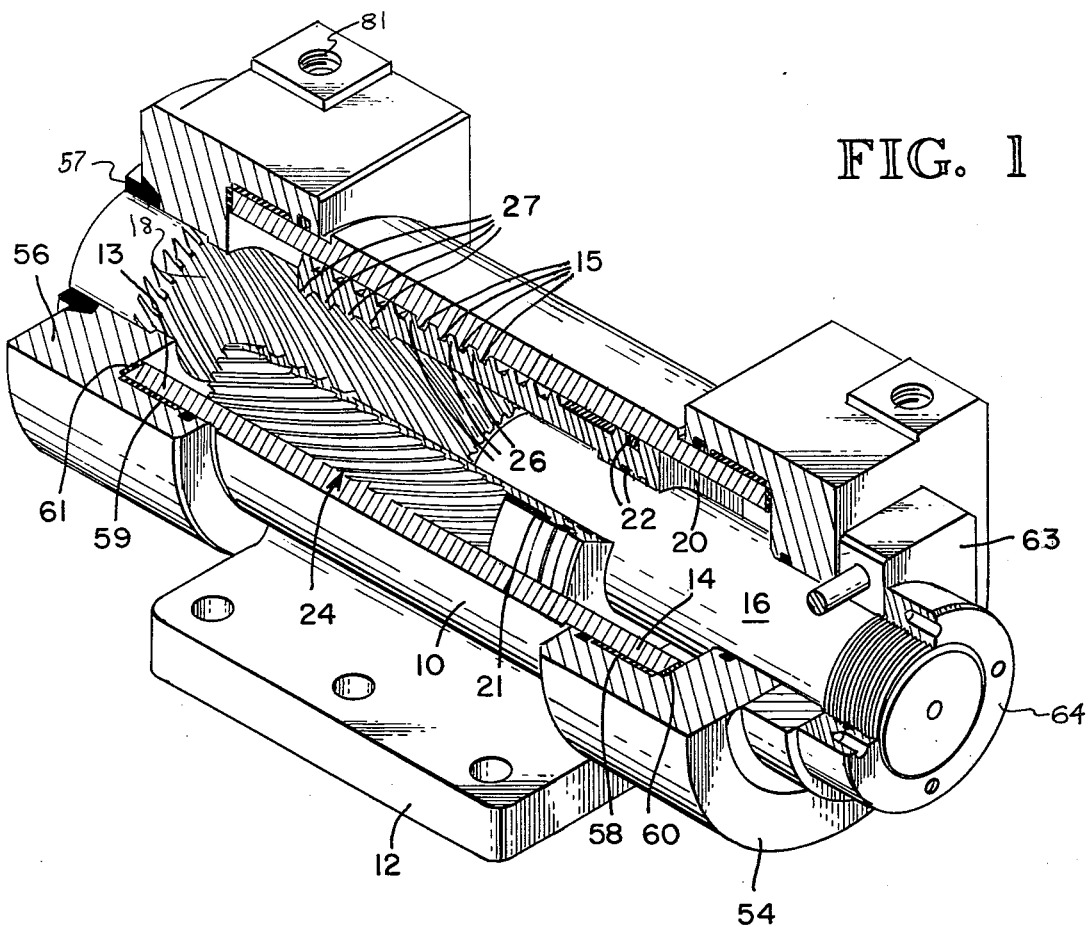
FIG. 1 is an isometric of an embodiment of the invention with parts broken away for clarity.
Figure 2:
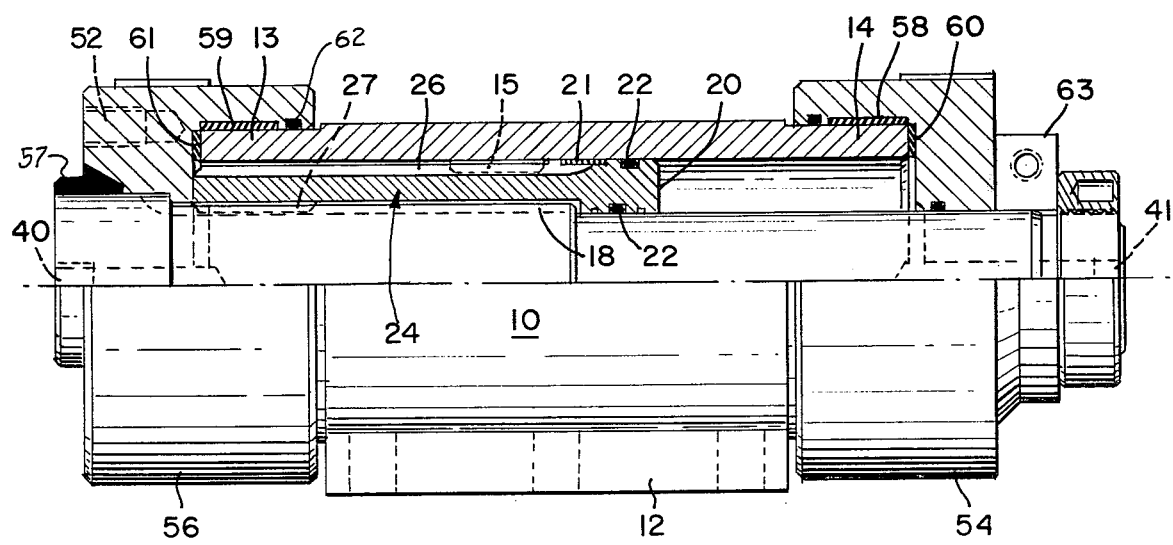
FIG. 2 is a longitudinal half-section.

As best shown in FIGS. 1 and 2, the helical actuator of this invention includes a cylinder or housing 10 having an integral mounting bracket 12 and opposite ends 13 and 14. The inner surface of the cylinder 10 is provided with helical splines 15. It should be understood that while helical splines are shown in the illustrated drawing, the principle of the invention is equally applicable to any form of linear-to-rotary motion conversion means, such as balls and screws of the type shown in U.S. Pat. No. 3,834,283.

Rotatably mounted within the cylinder 10 is a shaft 16. The shaft has an outer set of helical splines 18 that are spaced from the splines 15. Interposed between the shaft and the cylinder and linearly reciprocated therein is a piston 20 having bushings 21 and piston seals 22. In addition, the piston has an integral linear-to-rotary motion conversion portion 24 including outer helical splines 26 and inner helical splines 27. As is readily understood, reciprocation of the piston occurs when hydraulic fluid or air enters through port 40 or 41. As the piston linearly reciprocates, the inter-engagement or mesh between splines 26 and 15 causes the piston to rotate. The meshing between the splines 27 and 18 causes the shaft to rotate. With the combined rotation of the piston, as well as its linear movement, there is a multiplication of the rotary output of the shaft 16 depending upon the hand direction of the splines. If the hands are in opposite directions, the shaft will rotate approximately twice the amount the piston will rotate. If the hands are in the same direction, the shaft will not rotate at all or will rotate less than the rotation of the piston. The shaft is secured to bearing block 56 by weld 57 and to bearing block 54 by a press fit and additional clamp 63. The bearing block 56 is provided with torque transferring fastening holes, such as 52, for securely fastening the shaft to a stationary object or to an object to be rotated. In the alternative, bearing block 54 could be keyed to the shaft and also transmit torque.

It is a unique feature of this invention that these bearing blocks 54 and 56, rather than extending axially in the plane of the cylinder, are formed with integral flanges which extend radially and axially centrally, towards the center of the cylinder rather than away from the center of the cylinder. This causes the flanges to overlie the cylinder, reducing the overall length of the shaft and actuator. Within these flanges are provided radial bearings 58 and 59 and thrust bearings 60 and 61. The thrust bearings advantageously seat against the inner end wall of the bearing blocks. Fluid seals 62 are provided externally of the radial bearings, but could be internal in the alternative. Nut 64 is threaded onto shaft 16 and serves to adjust the axial clearance between bearing blocks 54 and 56 and housing 10. As is readily apparent, the circumferential area of the bearings 58 and 59 is (because of their greater diameter) substantially larger than the cross-sectional area of equivalent length bearings if attached directly to the shaft, as in U.S. Pat. No. 3,255,806. Thus its greater bearing and support flange allows the shaft to transfer greater radial loads and to withstand greater bending moment load such as where the actuator was used as a vertical pivot pin for an articulated boom.

While the benefits of the short length and high radial load capability are best achieved with a wrap-around bearing on each end, as shown, it should be understood that a single wrap-around bearing and a conventional internal bearing on the opposite end may suffice for same application, such as is in FIG. 4, where length is not limited.

Figure 5:
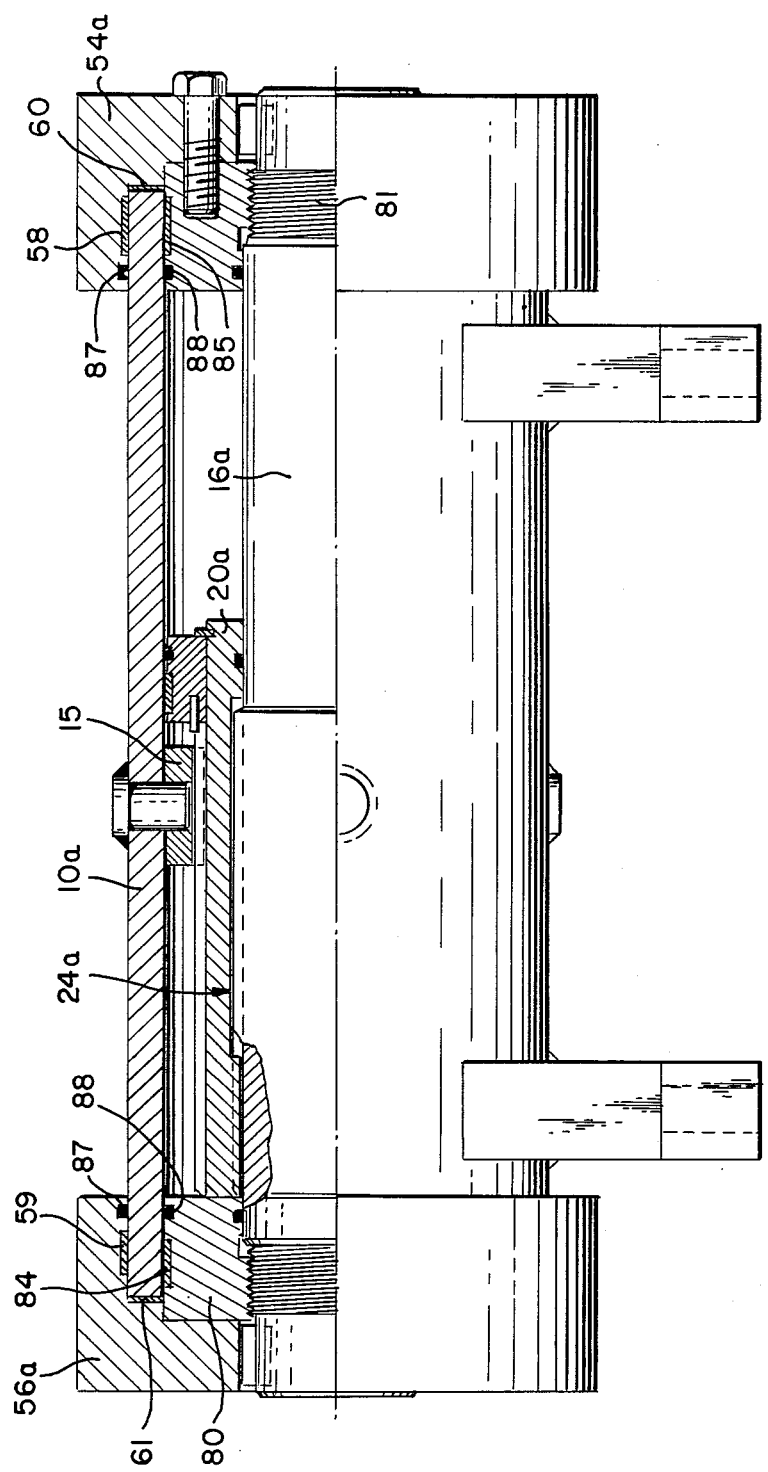
FIG. 5 is a longitudinal half-section of a preferred embodiment.

In the preferred embodiment of FIG. 5, wrap-around bearing blocks 54a and 56a surround the cylinder 10a, in which is mounted a ring gear 15 of the type shown in copending application Ser. No. 146,335, filed May 2, 1980, entitled "Combined Linear and Rotary Actuator and Floating Ring Gear," which description is incorporated herein by reference thereto. The shaft 16a is rotatably supported in the bearing blocks by collars 80 and 81 threaded to the shaft. Large diameter, internal radial bearings 84 and 85 are seated on the collars and combine with the wrap-around bearings 58 and 59 to greatly increase the radial and torque-loading capacity of the actuator. Thrust bearings 60 and 61 are provided, as in the other embodiments.

In the preferred embodiment, rotation of the output shaft or the housing is provided through the helical linear-to-rotary transmission portion 24a and piston 20, as in the earlier embodiment. Conventional dirt seals 87 and hydraulic seals 88 are also provided.

The primary advantage of the preferred embodiment over the embodiments of FIGS. 1-4 is the addition of a second set of radial bearings 84 and 85 which substantially double the bearing capacity of the actuator, making it even more advantageously used in heavy load pivot and swing applications.

By providing fastening holes or brackets, such as bracket 12 and holes 52, it can be seen that the bracket can be held stationary or fixed stationary on a frame and, by the introduction of hydraulic fluid, cause the shaft to rotate. In the alternative, the shaft could be held stationary in the frame and the boom or other articulated object fastened to the bracket 12. In either instance, compactness and high torque and bending moment capabilities of the actuator may be readily usable.

In FIG. 3, the actuator housing bracket 12 is secured to one part 80, which is shown having a restricted axial length, and the bearing blocks 54 and 56 secured to a second part 83, either of which or both can be movable parts. The bearing blocks are attached to the part by screws 82 threaded into holes 81.

In FIG. 4, the actuatory housing bracket 12 is bolted to a part 86 and the bearing block 56 is screwed to a second part 87, either of which can be a movable part.

While the preferred embodiments of the invention have been illustrated and described, it should be understood that variations will be apparent to one skilled in the art without departing from the principals herein. Accordingly, the invention is not to be limited to the specific embodiment illustrated in the drawings.

I claim:

1. A rotary actuator of the type having axially movable piston means and rotary shaft means with helical torque transfer means interconnecting the axially movable piston means with the rotary shaft means to provide rotation in response to axial movement of the piston means, the improvement comprising:
    actuator cylinder means;
    said shaft means mounted in the cylinder means;
    bearing means mounting the cylinder means and shaft means at opposite ends thereof for rotation relative to one another;
    said piston means axially movable within the cylinder means, said piston means including motion conversion means coupled to the cylinder means and shaft means for converting axial motion of the piston means into relative rotary motion between the shaft and cylinder means; and
    said bearing means each including a radially outer circumferential flange which extends axially over the cylinder means, radial and thrust bearing members positioned between the cylinder means and the flanges whereby large radial and thrust loads on the shaft means or the cylinder means can be withstood without increasing the length of the cylinder means.

2. The actuator of claim 1, said shaft means including means extending the diameter of the shaft means, and including a second set of radial bearings between said shaft diameter extending means and said cylinder means for increasing the bearing capacity of the actuator.

3. The actuator of claim 1 or 2, wherein said cylinder means is stationary and the shaft means rotates and becomes an output member, and means for rigidly fastening said output member and said cylinder means to separate structures.

4. The actuator of claim 1 or 2, wherein said shaft means is stationary and said cylinder means rotates to become an output member, and means for rigidly fastening said output member and said cylinder means to separate structures.

5. The actuator of claim 1 or 2, said cylinder means including inner helical first splines, said shaft means including outer helical second splines spaced from said first splines, said motion conversion means being secured to said piston means and including outer helical third splines meshing with said first splines, and inner helical fourth splines meshing with said helical second splines.

6. The actuator of claim 1, wherein at least one of said bearing means flanges overlies a portion of the cylinder means traversed by said piston means.

7. A rotary actuator of the type having axially movable piston means and shaft means with helical torque transfer means interconnecting the axially moving piston means with the shaft means to provide rotation in response to axial movement of the piston means, the improvement comprising:
   actuator cylinder means;
   said shaft means mounted in the cylinder means,
   bearing means mounting the cylinder means and shaft means opposite ends thereof for rotation relative to one another;
   said piston means axially movable within the cylinder means, said piston means including motion conversion means coupled to the cylinder and shaft means for converting axial motion of the piston means into rotary motion between the shaft and cylinder means, at least one of said bearing means including a radial outer circumferential flange which extends over the cylinder means, radial and thrust bearing members positioned between the cylinder means and the bearing means whereby large radial and thrust loads on the shaft or the cylinder can be withstood without increasing the length of the cylinder means.

8. The actuator of claim 7, said shaft means including means extending the diameter of the shaft means, and including a second set of radial bearings between said shaft diameter extending means and said cylinder means for increasing the bearing capacity of the actuator.

9. A rotary actuator of the type having axially movable piston means and shaft means with helical torque transfer means interconnecting the axially movable piston means with the shaft means to provide rotation in response to axial movement of the piston means, the improvement comprising:
   actuator cylinder means having an outer circumferential surface;
   said shaft means in the cylinder means;
   bearing means mounting the cylinder means and shaft means at opposite ends thereof for rotation relative to one another;
   said piston means axially movable within the cylinder means, said piston means including motion conversion means coupled to the cylinder means and shaft means for converting axial movement of the piston means into relative rotary motion between the shaft and cylinder means; and
   said bearing means each including a radially outer circumferential flange, said flanges each including an inner end wall confronting said cylinder means, said flanges extending axially over the cylinder means, radial bearings between said flanges and said cylinder means outer circumferential surface, and thrust bearings positioned between said bearing means and said cylinder means.

10. The actuator of claim 9, said shaft means including collar means extending the diameter of the shaft means, and including a second set of radial bearings between said collar means and said cylinder means for increasing the bearing capacity of the actuator.

11. The actuator of claim 10, including fluid seals between the collar means and the cylinder means and dirt seals between the flanges and the cylinder means, the dirt seals positioned external to said radial bearings.

12. The actuator of claim 9, including fluid seals located between said flanges and said cylinder means externally of said radial bearings.

* * * * *